Nov. 19, 1963 A. W. FRENCH ETAL 3,111,080
SCREW PRESS
Filed Nov. 20, 1958

INVENTORS
ALFRED W. FRENCH &
BY FOREST STARRETT, Jr.

ATTORNEYS

Nov. 19, 1963  A. W. FRENCH ETAL  3,111,080
SCREW PRESS
Filed Nov. 20, 1958  4 Sheets-Sheet 2

INVENTORS
ALFRED W. FRENCH &
BY FOREST STARRETT, Jr.

ATTORNEYS

Nov. 19, 1963 A. W. FRENCH ETAL 3,111,080
SCREW PRESS
Filed Nov. 20, 1958 4 Sheets-Sheet 3

INVENTORS
ALFRED W. FRENCH &
BY FOREST STARRETT Jr.

ATTORNEYS

Nov. 19, 1963 A. W. FRENCH ETAL 3,111,080
SCREW PRESS
Filed Nov. 20, 1958 4 Sheets-Sheet 4
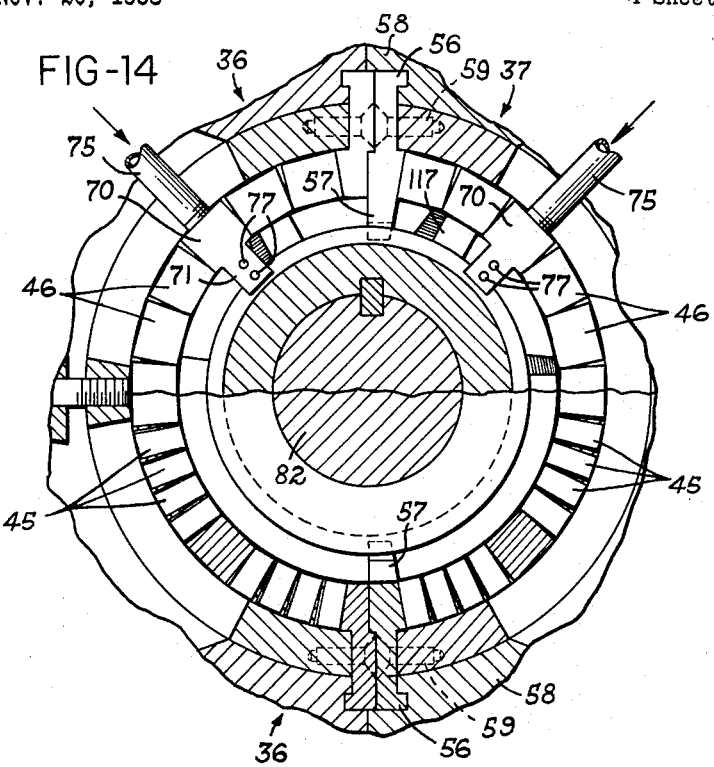
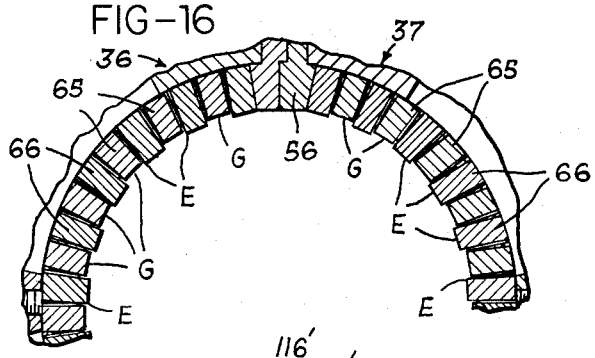
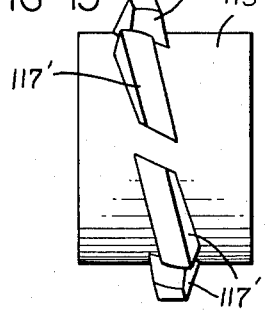
INVENTORS
ALFRED W. FRENCH &
BY FOREST STARRETT Jr.
ATTORNEYS United States Patent Office 3,111,080
Patented Nov. 19, 1963

3,111,080
SCREW PRESS
Alfred W. French and Forest Starrett, Jr., Piqua, Ohio, assignors to The French Oil Mill Machinery Co., Piqua, Ohio, a corporation of Ohio
Filed Nov. 20, 1958, Ser. No. 775,201
4 Claims. (Cl. 100—37)

This invention relates to apparatus for mechanically pressing and working materials and more particularly to a screw press having improved shaft and body structures for physically reducing material going through the press.

Screw presses have been used for some time to press material such as cotton seed, peanuts, soy beans, and so forth. Use has also been expanded to include sorghum, sugar cane, wood chips and similar fibrous materials in which either the natural juices are extracted for recovery, or the material physically reduced to a defibered condition for use in subsequent manufacturing operations. Screw presses capable of developing extremely high compacting and defibering pressures are particularly useful for use on fibrous materials regardless of whether the juices are to be recovered or the material is to be defibered and used elsewhere, the complete defibering achieved through use of these apparatuses being instrumental, in the case of sorghum, etc., in recovering larger percentages of the juices. Defibering of wood chips for use in paper making processes can also be advantageously accomplished in a screw press where suitable structural elements are included to assure complete defiberization. Thus, the usefulness of the presses are more or less dependant upon their ability to defiber or otherwise mechanically work the material passing through.

It is a principal object of this invention to provide a screw press having a screw flight for moving material through the press which presents a plurality of working edges for mechanically working the material.

It is an additional object of this invention to provide a screw press having shaft and body constructions presenting a reasonably large number of working edges and surfaces to increase the physical and mechanical working of the material.

It is another object of this invention to provide a relatively short screw press with axially extending shaft means carrying a pressure collar thereon having an outer surface presenting working edges to increase the rate of difibering of fibrous materials and the like being run through the press.

Another object of this invention is to provide a relatively short screw press capable of thoroughly mixing, agitating and defibering fibrous materials and the like in which axially extending shaft means carries alternating screw flights and pressure collars which each present a plurality of edges for physically working the fibrous material to reduce it to thoroughly defibered form.

It is a further object of this invention to provide a screw press having a body member surrounding rotatably mounted working flights, which body includes axially extending recesses increasing the mechanical working of the material during its passage through the press.

Still another object of this invention is to provide a screw press having a body member including screen bars which define a cylindrical working chamber and present a plurality of inclined working edges to cooperate with oppositely inclined edges formed on pressure collars carried by shaft means extending through the working chamber, thereby increasing the physical defibering of the material as it passes through the press.

Another object of this invention is to provide a screw press including a plurality of notched worm flights alternating with pressure collars, both the flights and the collars having working edges to act against the material as it is passing between successive screw flights.

It is another object of this invention to provide apparatus for injecting a fluid into the interior of the press to aid flow of the material through the press and improve physical defiberization thereof as it is being physically worked.

Other objects and advantages of this invention will be apparent from the following description, the accompanying drawings and the appended claims.

In the drawings—

FIG. 14 is a section through the treating chamber as viewed along the line 14—14 of FIG. 6;

FIG. 15 is a side elevation of another form of working flight; and

FIG. 16 is a fragmentary cross-section taken through the upper portion of the cage of the press shown in FIG. 1, opposite one of the screw flights, and with the corresponding portion of the screw flight omitted.

Figure 1:
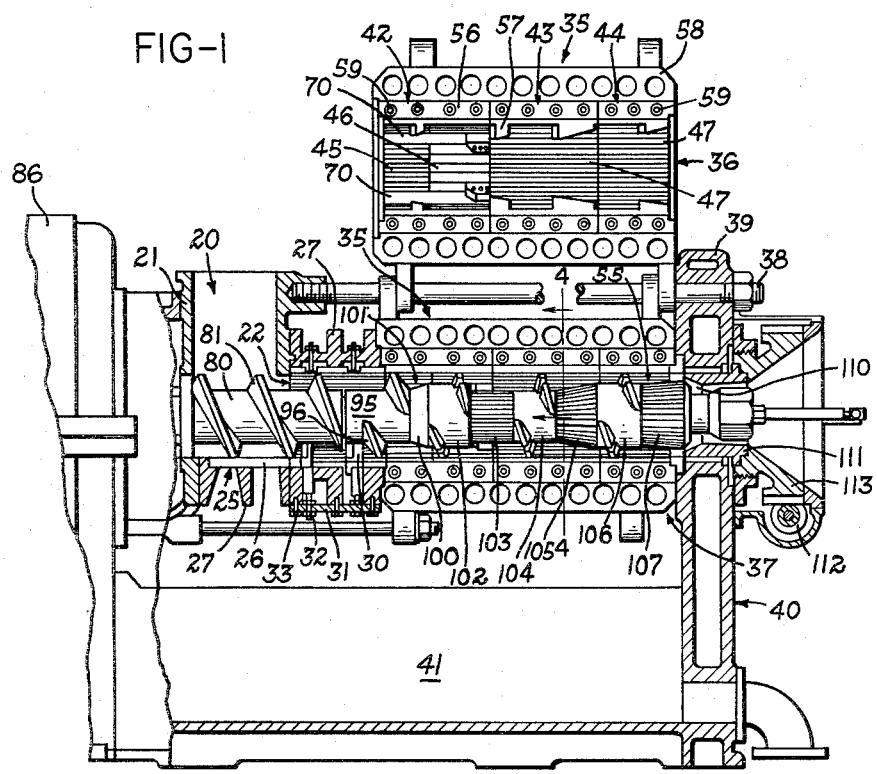
FIG. 1 is a sectional view of a preferred embodiment of a shortened form of screw press according to the present invention, with the treating chamber shown in developed view and illustrating the assembled positions of the screw flights and pressure collars.

Since the present apparatus is of particular use in mechanically treating fibrous materials like sugar cane, wood chips, etc., the description will be made with reference to these materials rather than other materials such as cotton seed, etc., mentioned earlier, even though the press is of value in handling the latter materials also. The preferred, shortened form of press shown in FIG. 1 is of particular value in defibering wood chips for use in the production of hardboard and also preparing them for subsequent operations in paper manufacturing. These advantages are obtained through the ability of the press to effect thorough and complete defibering of the material in a single pass.

The press is constructed with a feed chute 20, formed by vertically extending walls 21, which empties into a horizontally extending feed chamber 22 formed by preliminary drainage cage 25. Cage 25 is constructed of a plurality of elongated screen bars 26, the screen bars being mounted in proper operating position by reinforcing and supporting structure 27. The screen bars 26 are spaced apart a slight distance to provide drainage openings which make possible drainage of fluid from feeding chamber 22 through the walls of cage 25. Push through-breaker bars 30 extend from the supporting structure 27 into the feeding chamber 22 and are adjustably secured to a holding strip 31 through adjustable fasteners 32, screws 33 then being used to mount the holding strip 31 on supporting structure 27.

An elongated body 35 extends outwardly from drainage cage 25 and is constructed of semi-cylindrical body members 36, 37 which are pivotally connected to a longitudinally extending tie rod 38 providing for opening of the body 35 for purposes of repair, cleaning and so forth. One end of tie rod 38 is threaded into an appropriately drilled and tapped extension protruding from the wall 21 of feed chute 20 and the opposite end is supported within frame 39. Frame 39 constitutes an integral part of supporting base 40, the base having a hollow interior 41 acting as a collection chamber for fluids, when present, flowing from cage 25 and body 35.

Each of the body members 36 and 37 is constructed of a plurality of sections 42, 43 and 44 with the first section 42 containing a portion having screen bars 45 of the same construction and spacing as screen bars 26 so that fluid can be expressed outwardly between the bars. The remainder of the section 42 contains bars 46 of about twice the thickness of bars 45 which are mounted in abutting relationship so that there are no spaces between adjoining bars.

Figure 2:
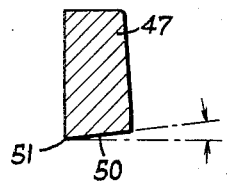
FIG. 2 is a sectional view of a beveled screen bar such as is used in the press shown in FIG. 1 to form working edges on the inner walls of the press body.

The remaining sections 43 and 44 each contains a circular series of bars 47 similar in thickness to the bars 45, which are separated by spacers 48 (FIG. 4) to provide drainage openings extending through the walls of the body. As shown most clearly in FIGS. 2 and 4, each of the bars 47 has a beveled inner surface 50 which extends from one side wall of the bar to the other to form a working edge 51 which is coplanar with one of the side walls of the bar. When the bars 47 are arranged in the circular series shown in FIG. 4, the beveled or inclined inner surfaces of the bars effectively cause the working edges 51 to protrude inwardly into the working chamber so that material adjacent and in contact with the inner walls will be physically worked as it passes through the press.

When the two assemblies 36, 37 are connected together to form the single cylindrical body 35, they define an elongated, closed working chamber 55 in which the materials can be worked under high pressure to achieve thorough disintegration or defibering thereof. Subsequent sections such as 43 and 44 are provided, which may be either solid or with drainage openings. For instance the solid section 46 could extend through all of section 43 and if desired over part of section 44, the remainder thereof having drainage openings. Whether or not any fluid expression should take place will depend upon the particular use to which the press is put. For example, if it is used to defiber and express juice from sugar cane then obviously drainage openings would be necessary. If the press is used solely for physically or mechanically defibering wood chips the drainage openings could be closed, particularly when chemically reactive treating fluids are added to the wood chips during the course of their passage through the chamber 55.

One of the members 36, 37, shown as member 36 in this instance, has diametrically spaced breaker bars 56, with breaker lugs 57, attached to the reinforcing structure 58 by screws 59 so that the breaker lugs 57 will extend into the working chamber 55 when the bodies are united. The breaker lugs 57 serve to cause axial movement of material through working chamber 55 in accordance with accepted practice.

In the present invention, the bars 47 in sections 43 and 44 not only define the outer walls of the working chamber, but also increase the mechanical defibering of substances passing through the working chamber 55. The additional defibering action is achieved, in the form shown in FIG. 4, by mounting the bars 47 so that the beveled inner surfaces cause the working edges 51 to be located inwardly from the edge of the adjoining screen bar, as previously described.

A second manner in which increased defibering can be achieved is the bar construction shown in FIG. 16, in which one group of bars is mounted in alternating relationship with another group of bars having their inner surfaces at a different distance from the axis of body 35 than the first group. Specifically, alternate bars 65 are reduced in radial thickness so that the inner surfaces of every other bar will be positioned within a different generally cylindrical surface from a similar surface containing the inner walls of the remaining bars 66. Such an arrangement creates a number of longitudinally extending recesses or grooves G creating many more cutting or defibering edges E than would be present if the bars were mounted to form an essentially continuous inner wall surface. Of course, the number of cutting edges E is less, for a given press size, than the number of cutting edges 51 formed by bars 47. However, it is felt that the grooves G may cause additional defibering by creating a nozzle-like effect in which disintegration of the fibrous material is obtained through sudden expansion thereof.

The press includes injector bars 70 within section 42 which extend the full length of the section and are of the same cross sectional size and shape as bars 47 and are used for injecting fluid into the working chamber 55. The bars 70 can be used to inject treating fluid such as caustic soda, water or steam, if a fibrous material like wood chips is being treated, or a maceration liquid such as water when sugar cane or related material is being run though the press. The injector bars 70 are arranged at 90° intervals around the circumference of section 42 and positioned 45° from the plane containing breaker bars 56. Each injector bar 70 has at least one injector lug 71 which extends radially into the working chamber 55. Thus, where the injector lugs 71 extend into the working chamber the breaker bar lugs can be omitted, as the injector lugs will act in the same manner on material in body 35 as would the breaker bar lugs 57.

Figure 7:
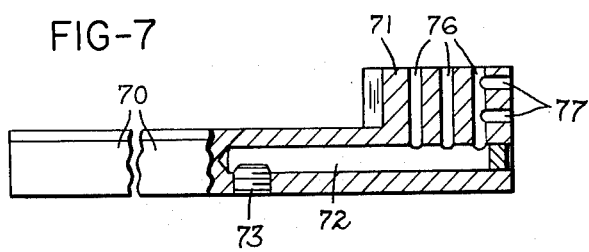
FIG. 7 is a side view of an injector bar for use with the apparatus of FIG. 6, with part of the bar being shown in section to more clearly indicate the passages for introducing treating fluid.
Figure 8:
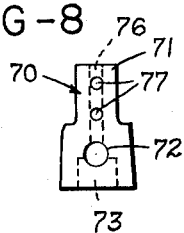
FIG. 8 is an end view of the bar of FIG. 7.
Figure 9:
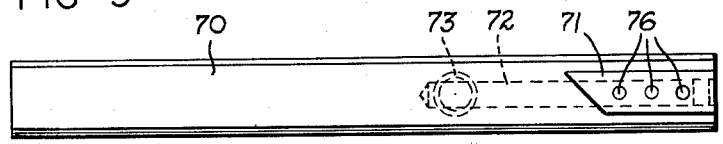
FIG. 9 is a top plan view of the injector bar of FIG. 7.
Figure 10:
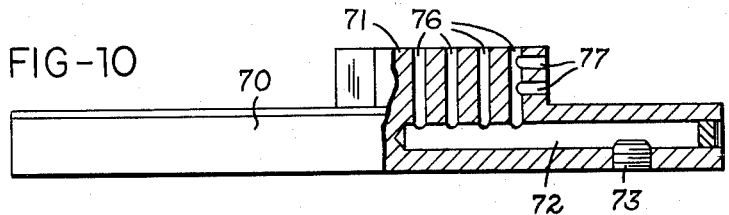
FIG. 10 is a side view in part sectional and in part full of a modified form of fluid injecting bar.
Figure 11:
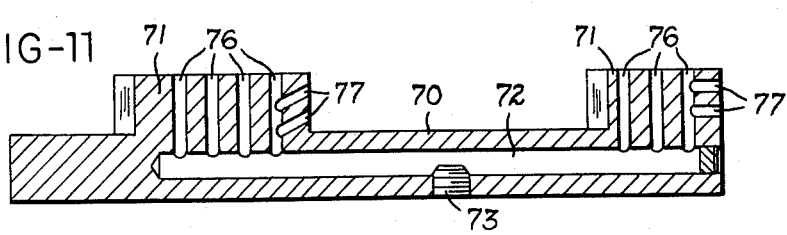
FIG. 11 is a longitudinal section through still another modified form of fluid injector bar having two injector lugs.

As shown in FIG. 7 the body of the injector bar is provided with an elongated passage 72 extending lengthwise of the bar and an internally threaded center opening 73 to which a supply pipe or similar device can be easily adapted. Attachment of such supply pipes, such as 75 (FIG. 14), can therefore be easily effected to supply treating fluid to the interior of the bars 70. Each injector lug 71 contains radially extending fluid passages 76 as well as longitudinally extending passages 77 for the purpose of conducting fluid from passage 72 into the interior of the working chamber 55.

Superior defibering and liquid penetration of the material, where additional fluid is added, is in part achieved through use of the shaft means which moves the material through body 35 and cooperates with the working edges on the inner walls of the body. Referring once again to FIG. 1, a feed screw 80 having a spiral worm flight 81 is located within feed chamber 22 to receive material from chute 20 and move it inwardly into the drainage cage 25. Screw 80 is mounted on a drive shaft which extends completely through the feeding chamber 22 and working chamber 55 and is driven by a suitable motor. Since the driving means for the apparatus of FIG. 1 is the same as that shown in the modified form of screw press shown in FIG. 6, reference is made to the latter FIG. for explanation of the driving means. The drive shaft 82, which carries feed screw 80, is driven by a suitable motor 85 mounted on gear housing 86, which housing contains a pair of driven gears 87 and 88 and is mounted adjacent the wall 21, gear 87 being operably connected through a driving sleeve 89 to the shaft 82. The gear 88 is operably connected through a sleeve 90 to the feed screw 80, both gears 87 and 88 being driven through a suitable connection with motor 85. Gear 88 should preferably operate at a higher speed than gear 87 so that the feed screw 80 may be rotated faster than shaft 82.

Figure 6:
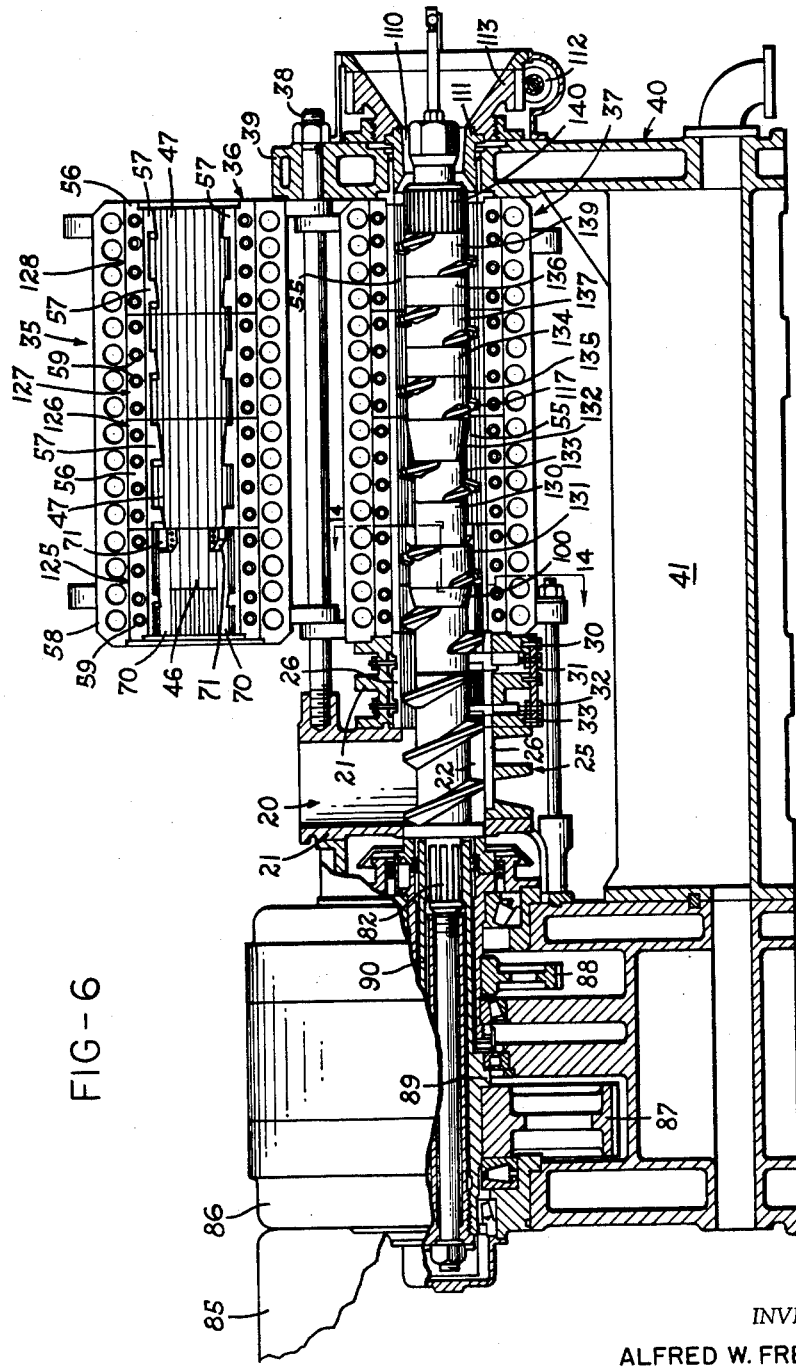
FIG. 6 is a sectional view of a modified form of apparatus according to the present invention, with the treating chamber shown in developed view.

Returning to the press construction shown in FIG. 1, which is comparatively shorter than the modified press shown in FIG. 6, a second feed screw 95 is mounted on shaft 82 following the feed screw 80. The second feed screw 95 has a worm flight 96 extending around the circumference thereof to receive material from the first feed screw and to move it toward the working chamber 55. As shown in the drawings, the push through breaker bars 30 extend to a point just above the position of the feed screws 80 and 95 so that the material may advance through drainage cage 25 in an axial manner.

A pressure collar 100 is mounted on shaft 82 in abutting relationship with second screw 95 and within that part of preliminary drainage cage formed by the screen bars 45 in body members 36 and 37. The diameter of pressure collar 100 increases from the leading toward the trailing edge thereof to create an impediment to flow of material from drainage cage 25 into the working chamber 55. Material being moved by screws 80 and 95 must pass through the restricted area 101 located between the screen bars 45 and collar 100 so that severe compacting of the material will occur at this location. Such compacting causes increased expression of natural juices or of any preliminary treating liquids from the material before it enters the actual working chamber 55.

The restricted area 101 defines the inlet opening into the interior or working chamber 55 and the compacted material in the area 101 serves as a plug of caked material capable of preventing the escape of treating of lubricating fluid or pressure which may be present in the working chamber under certain conditions. Following pressure collar 100 on drive shaft 82 is a plurality of alternately arranged defibering flights 102, 104 and 106 and pressure collars 103 and 105 and a final discharge collar 107.

The outlet or discharge end of treating chamber 55 is sealed by means of a plug of caked material similar to that formed around collar 100 in the inlet opening. Here the plug of material is formed around discharge collar 107 within the restricted passage 110 created by the axially adjustable outlet cone 111. The cone can be adjusted through the worm gear 112 which is operably connected to ring gear 113. Rotary movement of the ring gear 113 causes discharge cone 111 to either advance toward or withdraw from discharge collar 107 and vary the size of passage 110.

Figure 12:
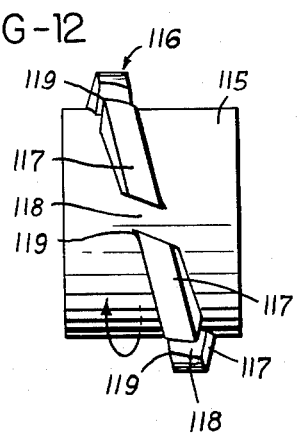
FIG. 12 is a side elevation of an improved working flight according to the present invention.
Figure 13:
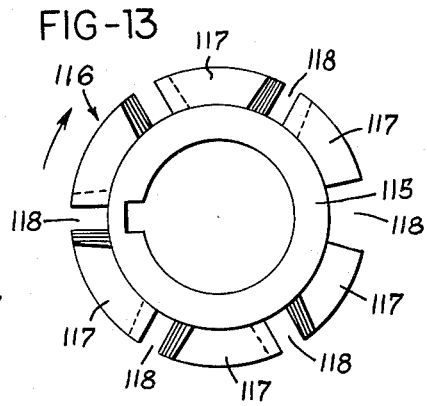
FIG. 13 is an axial view of the working flight of FIG. 12.

Each defibering flight is constructed, in the form shown in FIGS. 12 and 13 of the drawings, of a substantially cylindrical body member 115 and a working flight 116 which extends outwardly from the body member toward the outer wall of working chamber 55. The working flight 116 is composed of a plurality of circumferentially spaced and longitudinally staggered flight segments 117, separated by gaps 118, which are arranged in helical alignment about the outer circumference of body member 115. In the modified flight construction shown in FIG. 15 of the drawings, the flight 116' is constructed of flight segments 117' which also are circumferentially spaced and longitudinally staggered but are not in alignment permitting a common helical center line to be passed through all of the segments. This construction provides for a somewhat greater bite of the segments into the material while correspondingly decreasing the axial advance of the total flight 117'.

The segments 117 have the plurality of notches or gaps 118 separating adjoining segments to form a working edge 119 on the leading face of each segment to provide for multiple engagement with the material while in contact with the same flight. The multiple working edges 119 will continuously remove material and force it through the flight 116 at a plurality of locations about the circumference of the shaft means, the gaps 118 providing the means for passing material in the manner described. The simultaneous working and mechanical reorientation of the material about the circumference of the shaft means not only improves the working characteristics of the press but also results in a more equal distribution of forces acting against the drive shaft 82 to reduce the tendency for development of harmonic forces capable of breaking the shaft. Equal distribution of forces also improves bearing life and helps the shaft 82, which is a cantilever shaft, to retain its centered position within body 35.

As previously stated, the present apparatus aids impregnation of the material with added fluid, where such fluid is used. Generally this is accomplished by making the diameter of collar 103 substantially less than the diameter of the body of flight 102 so that the area formed between the outer surface of collar 103 and the walls of chamber 55 is greater than that between flight 102 and the walls of chamber. The injector lugs 71 extend into the area over collar 103 making it possible for fluid to be present when the material is expanding, as a result of the decrease in mechanical pressure exerted against it when it clears the down stream side of flight 102. This provides greater absorption of treating fluid into the material. When the bars 47 are closed, thereby preventing any expression of liquid out of the working chamber 55, further impregnation may be accomplished by the thorough defiberization, reorientation and mechanical pressure exerted against the fibers throughout the remainder of the press. For more detailed description of this process, reference is made to copending application Serial No. 775,180, filed of even date herewith and assigned to the same assignee as the present application.

Although the press shown in FIG. 1 is comparatively short, it is able to effect thorough and reasonably complete defiberization of tough, fibrous materials such as wood chips in a single pass of the material through the working chamber. While the notched defibering flights 102, 104 and 106 perform a large amount of defibering, the defibering potential of the press is increased by the particular type of pressure collars used. Specifically, the outer surfaces of the collars are constructed to present a plurality of elongated working edges to engage the material adjacent and in contact with the flight and cause additional defibering thereof, since the collars have some rotation relative to the material being moved through the press.

Figure 3:
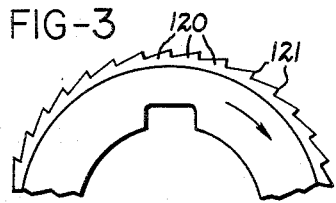
FIG. 3 is a fragmentary end view of a pressure collar having a tooth-like outer surface for working the material passing through the press.
Figure 5:
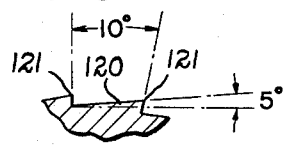
FIG. 5 is a somewhat enlarged fragmentary section of the surface of the pressure collar and showing the construction of the individual teeth.

Referring to FIGS. 3 and 5, the outer surface of the collars 103, 105 and 107 are given a tooth-like configuration consisting of a plurality of angled teeth 120 presenting working edges 121. Although the exact formation of the teeth may vary somewhat depending upon the conditions imposed by a particular situation, teeth having one outer surface angled about 5° outwardly from the point of origin of a tangent to the outer surface of the collar, as shown in FIG. 5, and having the other outer surface extending radially outwardly to intersect said one outer surface have been found to be effective in defibering wood chips. In a press having a working chamber with a diameter of 8½ inches, for example, the radial height of the teeth on a collar having an outer diameter of 6¼ inches may be 7/64 inch. Also, the radial tooth surfaces, that is the outer surfaces aligned with radii of the collar, will be located at intervals of 10° about the axis of the collar.

Figure 4:
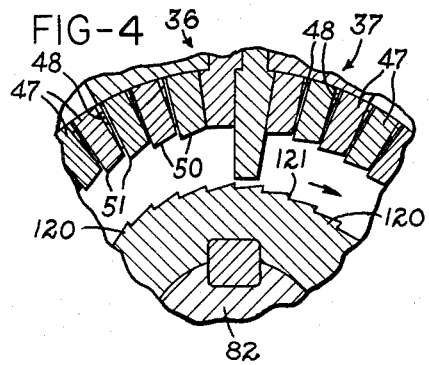
FIG. 4 is a fragmentary view taken substantially along the line 4—4 of FIG. 1 and showing the manner of cooperation between the working surface of the collars and the edges formed by the screen bars.

It will be noted by referring to FIG. 4, that the teeth 120 are angled to present their radial faces in the direction of rotation of shaft 82 and in opposition to the working faces and edges of bars 47.

The usual press construction, by virtue of using bars with smooth inner surfaces, collars with similar smooth surfaces and through the presence of the breaker bars 56, causes material to move axially through the areas or zones between the pressure collars and the inner walls of the body with some relative rotation between the collars and the material. Since the opposing surfaces are both smooth, there is no substantial defibering or physical mixing of the material but rather only compacting caused by the presence of the gradually narrowing area. In the present apparatus however the tooth like surfaces of the collar cause defiberization of the material adjacent and in contact with the collars, during the time that it is passing through the zones between the collars and the body walls. Similar working takes place in the material adjacent and in contact with the working edges 51, and coplanar surfaces, of the bars 47. Thus, the material is worked adjacent its inner and outer portions when passing over each of the collars 103, 105 and 107.

Outlining the operation of the press shown in FIG. 1, material is advanced from feed chamber 22 over pressure collar 100 by the feed screws 80 and 95 and into engagement with the notched, defibering screw flight 102 where it is subjected to defibering, reorientation and mixing actions from the plurality of working edges 119. The flight 102 moves the material axially toward the outlet end of the press and into the area between bars 47 and collar 103. At this point fluid such as steam or water may be added either to raise the residual moisture content of the material to assist at breaking down the connecting substances binding the fibers together or merely to act as a lubricating medium improving the flow characteristics of the material through the press. Some defibering of the material adjacent the beveled bars 47 and the working surface of collar 103 is also achieved, leaving the portion of the material intermediate the parts adjacent these working surfaces essentially in the same condition as it was upon leaving screw flight 102.

Upon leaving collar 103, the material is once again subject to the action of a defibering flight, 104, and is thoroughly mixed and reoriented so that the material is thoroughly intermingled and that material which had some additional defibering from the working surfaces of the bars and collar will be dispersed throughout the mass of material. Additional defibering and mixing actions are performed on the material as it passes through the remainder of the press, the last action occurring when the material is forced over discharge collar 107 through the outlet opening 110 of the press. The foregoing compression, defibering, mixing, and possibly chemical treatment is also accomplished within the screw press, which is capable of exerting sustained mechanical pressures on the material which may range as high as 5000 to 12,000 p.s.i., far in excess of pressures which are practical, for example, in other hydrostatic impregnation processes.

Test runs of the present apparatus, using oak chips as the fibrous material, show that very thorough defibering can be effected. The chips had an initial, inherent moisture content of about 33% and this value was raised to about 50%, by cooking the chips with steam and water, to act as a lubricant aiding flow of the material through the press. About 46 to 50 tons of the chips were run through a press using a 200 horsepower motor, and complete defibering was achieved, along with reduction of the moisture content to its original 33%. Additionally, there were some solid and salt materials removed from the chips, these removals representing additional beneficial results achieved through the use of the press.

Referring now to the modified form of defibering apparatus shown in FIG. 6 of the drawings, the overall construction of this press is similar to that of the press shown in FIG. 1. It uses the same type of driving means, feed chute, drainage cage construction, and general construction of body 35. However, while body 35 is generally similar to that used in the short press, it is somewhat longer and the sections 36 and 37 are made up of four bar sections, 125–128.

The major distinction between the two apparatuses, aside from the differences in comparative lengths, resides in the construction of the collars 130, 132, 134 and 136 located in the longer press. These collars, instead of being formed with tooth-like outer surfaces, are completely smooth so that any defibering of the material which occurs in the areas between these collars and the inner walls of body 35 formed by bars 47, will be performed by the working edges on the bars. That is, the material merely moves over the pressure collars without any substantial working or defibering thereof by the collars themselves. The action of screw flights 131, 133, 135, 137 and 139 is the same as the corresponding screw flights 102, 104 and 106, with of course the obvious exception that two additional screw flights are used. In this apparatus the discharge collar, 140, is constructed with a serrated or toothed outer surface like that of collar 107, to defiber additional quantities of the material as it is leaving the outlet end of the press. The longer press may be preferred when a treating fluid such as caustic soda is added to the material through injector bars 70 to dissolve the substances binding the fibers together, so that a longer working period is afforded to effect increased impregnation of the chips by the treating fluid.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. In a continuous screw press the combination of a cylindrical body having inlet and discharge openings at opposite ends thereof, shaft means including a plurality of screw flights in axially spaced relation thereon extending radially into close proximity with the walls of said body, means for rotating said shaft means in a direction to feed material through said body from said inlet to said discharge opening, feed means arranged to supply material to said inlet opening at a rate predetermined to maintain a plug of material in said inlet opening, means restricting said discharge opening to maintain a plug of material adjacent said discharge opening forming a sealed pressure chamber between said inlet and discharge openings, at least some portions of said shaft means within said chamber being of reduced diameter to form a zone of expansion in said chamber wherein the material is caused to expand, a lug extending radially between at least two of said screw flights within said chamber, means mounting said lug in stationary position within said chamber providing a breaker for resisting rotation of the material passing between the screw flights on opposite sides of said lug and effecting movement of the material through said chamber toward said discharge opening, and means defining a fluid passage through said lug opening into said chamber toward said shaft means to inject fluid into said zone of expansion in said chamber for treatment of the material passing therethrough.

2. In a continuous screw press the combination of a cylindrical body having inlet and discharge openings at opposite ends thereof and having drainage openings through the walls thereof, shaft means including a plurality of screw flights in axially spaced relation thereon extending radially into close proximity with the walls of said body, means for rotating said shaft means in a direction to feed material through said body from said inlet to said discharge opening, feed means arranged to supply material to said inlet opening at a rate predetermined to maintain a plug of material in said inlet opening, means restricting said discharge opening to maintain a plug of material adjacent said discharge opening forming a pressure chamber between said inlet and discharge openings, a substantial portion of said chamber being of greater cross-sectional area than said inlet opening and said discharge opening providing an expansion zone wherein the material is caused to expand as it passes from said plug thereof formed in said inlet opening, a lug extending radially between at least two of said screw flights, means mounting said lug in stationary position within said chamber providing a breaker for resisting rotation of the material passing between the screw flights on opposite sides of said lug and effecting movement of the material through said chamber toward said discharge opening, means defining a fluid conducting passage through said lug opening into said chamber adjacent said shaft means and directed toward said shaft means for injecting fluid in the area of said shaft means providing for forcing of the injected liquid through the material and outwardly through said drainage openings under mechanical pressure exerted by said press upon material within said chamber.

3. The continuous process of treating and defibering fibrous materials comprising the steps of continuously introducing the fibrous material into a generally cylindrical working chamber formed by a cylindrical body, said body having inlet and outlet openings at opposite ends thereof and having drainage openings through the walls thereof, continuously feeding the material through the inlet into said chamber and causing a first plug of compacted material to be formed at said inlet, removing the material from said first plug and continuously passing such material into an expansion section of said chamber wherein the material is perimtted to expand, injecting treating fluid into said expansion section of said chamber close to the center thereof and simultaneously working and defibering the material while advancing it through said expansion section to mix the treating fluid with the material as the fluid flows generally outwardly with respect to the center of said expansion section whereby the fluid is absorbed by the expanding material, restricting the flow of material from said chamber through said outlet sufficiently to form a second plug of compacted material, and expressing the treating fluid from the material in said chamber causing a substantial portion of the treating fluid to separate from the material and pass outwardly through the drainage openings in said chamber.

4. The continuous process of treating and defibering fibrous material comprising continuously introducing the material into a working chamber formed by a cylindrical body, said body having inlet and outlet openings at opposite ends thereof and having drainage openings of small size through the walls thereof providing for passage of liquids from the chamber, and also having rotary shaft means extending through said chamber with worm flights thereon for conveying the material through said chamber; the steps comprising continuously feeding the material through the inlet into said chamber at a rate predetermined to form a plug of compacted material at said inlet, restricting the flow of material from the chamber to said outlet sufficiently to form a separate plug of compacted material, injecting treating fluid into said chamber adjacent the center thereof, each of said plugs being of sufficient density to maintain pressure in the chamber therebetween and to prevent the injected fluid from flowing out said inlet and outlet openings, causing the material within said chamber to expand in at least one zone between said plugs and closer to said outlet than the point of injection of treating fluid and simultaneously causing the material to be mixed with the treating fluid and subjected to sufficient compacting pressure whereby the treating fluid is thoroughly mixed with the material and simultaneously worked through the material and expressed therefrom to flow from said chamber through said drainage openings, and creating in said chamber alternate zones of predominantly mixing and predominantly compacting areas whereby the material is alternately mixed and then compacted and defibered to maintain an alternating cycle of compacting and mixing while simultaneously subjecting the material throughout its passage through the chamber to physical working.

References Cited in the file of this patent

UNITED STATES PATENTS

| | | |
|---|---|---|
| 695,990 | Zoder | Mar. 25, 1902 |
| 829,314 | Anderson | Aug. 21, 1906 |
| 1,015,371 | Wolfe | Jan. 23, 1912 |
| 1,773,771 | Anderson | Aug. 26, 1930 |
| 2,466,492 | Sizer | Apr. 5, 1949 |
| 2,565,947 | Burghauser | Aug. 28, 1951 |
| 2,687,084 | Bowman | Aug. 24, 1954 |
| 2,893,909 | Shouvlin et al. | July 7, 1959 |
| 2,997,943 | Zies | Aug. 29, 1961 |

FOREIGN PATENTS

| | | |
|---|---|---|
| 335,649 | Germany | Apr. 7, 1921 |
| 548,411 | Germany | Apr. 15, 1932 |
| 229,769 | Great Britain | Mar. 2, 1925 |
| 438,443 | Italy | Aug. 10, 1948 |